(12) United States Patent
Saito et al.

(10) Patent No.: US 7,719,713 B2
(45) Date of Patent: May 18, 2010

(54) IMAGE PROCESSING APPARATUS, IMAGE PROCESSING METHOD MULTICOLOR IMAGE FORMING APPARATUS, COMPUTER-READABLE MEDIUM, AND COMPUTER DATA SIGNAL

(75) Inventors: Takeshi Saito, Kanagawa (JP); Kazuo Asano, Kanagawa (JP); Toru Misaizu, Kanagawa (JP); Shigeru Arai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 475 days.

(21) Appl. No.: 11/762,908

(22) Filed: Jun. 14, 2007

(65) Prior Publication Data
US 2008/0137113 A1   Jun. 12, 2008

(30) Foreign Application Priority Data
Dec. 6, 2006   (JP) .............................. 2006329184

(51) Int. Cl.
   *G06F 15/00*   (2006.01)
(52) U.S. Cl. ...................... 358/1.9; 358/3.09; 358/3.12; 358/534
(58) Field of Classification Search .................. 358/1.1, 358/1.9, 3.01, 3.02, 3.03, 3.06, 3.09, 3.12, 358/534; 382/237; 347/115, 131
See application file for complete search history.

(56) References Cited

U.S. PATENT DOCUMENTS

| 4,680,645 A | * | 7/1987 | Dispoto et al. ............. 358/3.02 |
| 5,309,246 A | * | 5/1994 | Barry et al. .................. 358/1.9 |
| 5,426,519 A | | 6/1995 | Banton |
| 5,949,965 A | | 9/1999 | Gondek |
| 2003/0231348 A1 | | 12/2003 | Ishii et al. |

FOREIGN PATENT DOCUMENTS

| JP | 6098184 | 4/1994 |
| JP | 8079552 | 3/1996 |
| JP | 11010918 | 1/1999 |
| JP | 11146189 | 5/1999 |
| JP | 2002077655 | 3/2002 |
| JP | 2003348347 | 12/2003 |

OTHER PUBLICATIONS

Notice of Grounds For Rejction from the Japanese Patent Office for Japanese Patent No. 2006-329184, with partial English translation.

* cited by examiner

*Primary Examiner*—Thomas D Lee
(74) *Attorney, Agent, or Firm*—Gauthier & Connors (57) ABSTRACT

An image processing apparatus, has: a conversion unit that converts input image information including a first color component and a second color component into output image information in which, with regard to each of the color components, the number of gray levels per pixel is smaller than the number of gray levels per pixel in the input image information and a gray level of the input image information is expressed by a gray level value of each pixel and a dot density and in which the size of a dot is different between the first color component and the second color component; and an output unit that outputs the output image information obtained by the conversion unit.

15 Claims, 10 Drawing Sheets

Fig. 9  NOTED PIXEL

Fig. 10

Fig. 11 — NOTED PIXEL

Fig. 12 — BLACK CORE DOT / NOTED PIXEL (BLACK SUB DOT)

Fig. 13 — WHITE CORE DOT / NOTED PIXEL (WHITE SUB DOT)

IMAGE PROCESSING APPARATUS, IMAGE PROCESSING METHOD MULTICOLOR IMAGE FORMING APPARATUS, COMPUTER-READABLE MEDIUM, AND COMPUTER DATA SIGNAL

CROSS-REFERENCE TO RELATED APPLICATIONS

This application is based on and claims priority under 35 USC 119 from Japanese Patent Application No. 2006-329184, filed on Dec. 6, 2006.

BACKGROUND

1. Technical Field

The present invention relates to an image processing apparatus, an image processing method, a multicolor image forming apparatus, a computer readable medium, and a computer data signal.

2. Related Art

Technology of converting original image information into image information in which the number of gray levels per pixel is reduced as compared with the original image information is known.

SUMMARY

According to an aspect of the invention, there is provided an image processing apparatus, having: a conversion unit that converts input image information including a first color component and a second color component into output image information in which, with regard to each of the color components, the number of gray levels per pixel is smaller than the number of gray levels per pixel in the input image information and a gray level of the input image information is expressed by a gray level value of each pixel and a dot density and in which the size of a dot is different between the first color component and the second color component; and an output unit that outputs the output image information obtained by the conversion unit.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described in detail with reference to the accompanying drawings.

Figure 1:
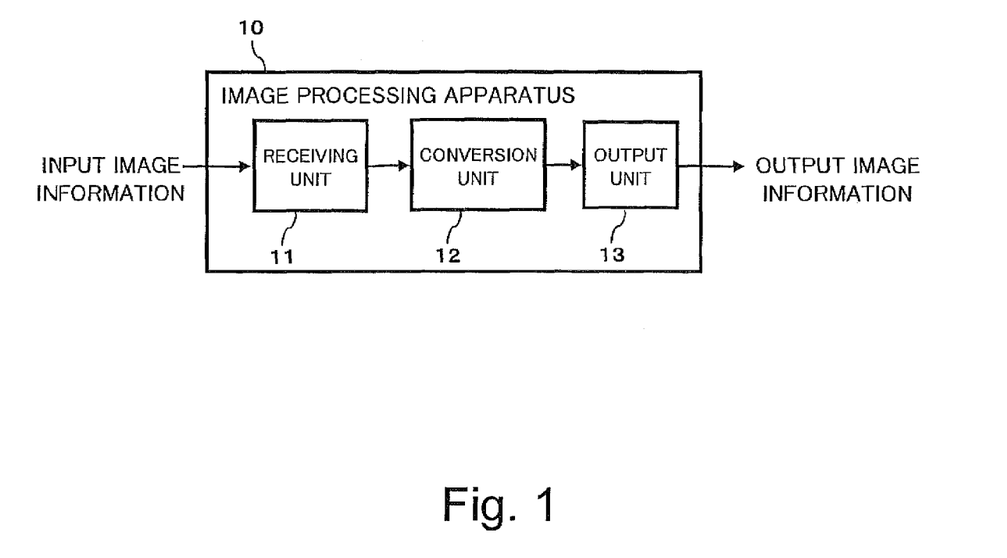
FIG. 1 is a block diagram showing the structure of an image processing apparatus according to an exemplary embodiment.

FIG. 1 is a block diagram showing a structure of an image processing apparatus 10 according to an exemplary embodiment of the present invention. The image processing apparatus 10 converts input image information containing at least two color components into output image information in which, with regard to both the color components, the number of gray levels per pixel is smaller than the number of gray levels per pixel of the input image information.

In one aspect, the image processing apparatus 10 is implemented by cooperation of hardware and software. For example, the function of the image processing apparatus 10 is implemented by reading an image processing program recorded in a recording medium such as a ROM (Read Only Memory) into a main memory and performing the image processing program by means of a CPU (Central Processing Unit). The image processing program may be provided through a recording medium such as a CD-ROM which records the image processing program or may be provided via a communication means. In another aspect, the image processing apparatus 10 is implemented by a hardware circuit.

As shown in FIG. 1, the image processing apparatus 10 includes a receiving unit 11, a conversion unit 12, and an output unit 13.

The receiving unit 11 receives input image information containing first and second color components. Here, the input image information includes multiple pixels, and each pixel has a gray level value for each color. The input image information may include at least the first and second color components and may include components of three or more colors. For example, the input image information may be image information including four color components cyan (C), magenta (M), yellow (Y), and black (B) or image information including three color components red (R), green (G), and black (B). The receiving unit 11 may receive input image information by means of a RAM (Random Access Memory) or the like.

The conversion unit 12 converts the input image information input in the receiving unit 11 into output image information in which, with regard to both color components, the number of gray levels per pixel is reduced as compared with the input image information. More specifically, the conversion unit 12 converts input image information in which the number of gray levels per pixel of the first color component is M1 (which is an integer equal to 3 or more) and the number of gray levels per pixel of the second color component is M2 (which is an integer equal to 3 or more) into output image information in which the number of gray levels per pixel of the first color component is N1 (which is an integer equal to 2 or more and is less than M1) and the number of gray levels per pixel of the second color component is N2 (which is an integer equal to 2 or more and is less than M2).

According to the present exemplary embodiment, from a viewpoint of suppressing generation of interference fringes (moiré fringes), the conversion unit 12 performs conversion of image information such that the gray level of the input image information with regard to both color components is expressed by the grey level value of each pixel and the dot density in the output image information. More specifically, the conversion unit 12 converts the image information by means of a method of expressing the gray level by the dot density (e.g. FM screen processing, error diffusion processing, and so on).

Further, according to the present exemplary embodiment, from a viewpoint of suppressing generation of color unevenness caused by a dot of the first color component and a dot of the second color component that are adjacent to each other or overlap each other, the conversion unit 12 performs conversion of image information such that the dot size differs between the first color component and the second color component in the output image information. For example, the conversion unit 12 converts image information such that the dot size of one color component is 1.2 or more times the dot size of the other color component.

Here, if a dot size is large, the level of graininess is poor. Yellow has a better level of graininess than do cyan, magenta, and black. Therefore, in the present exemplary embodiment, when the input image information includes a yellow color component and at least one of cyan, magenta, and black color components, the conversion unit 12 converts the image information such that the dot size of the yellow color component is larger than the dot size of the at least one of cyan, magenta, and black color components.

Figure 2:
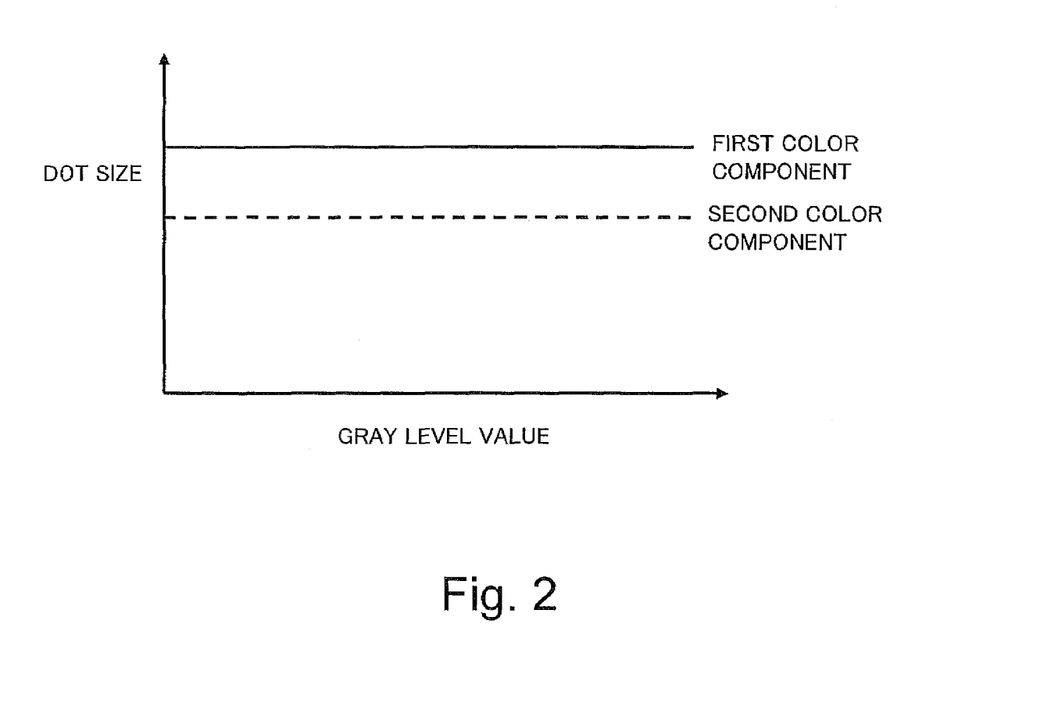
FIG. 2 is a view schematically showing an example relationship between the gray level value and the dot size.
Figure 3:
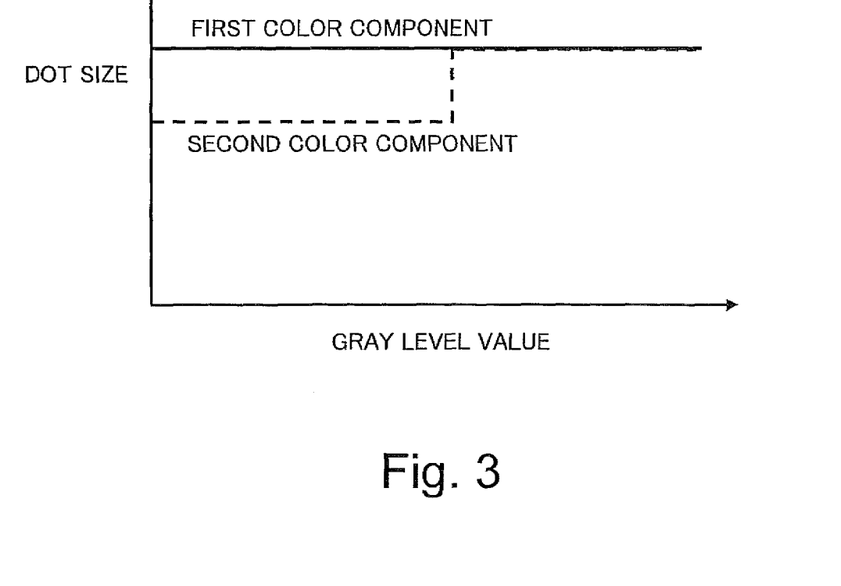
FIG. 3 is a view schematically showing another example relationship between the gray level value and the dot size.

Here, although in one aspect, as shown in FIG. 2, the dot size differs between the first color component and the second color component over the entire gray level region, the dot sizes may differ from each other only in a portion of the gray level region. For example, in the case of printing and outputting by means of electrophotography, it may be the case that the original shape is not reproduced in the high concentration region, because toner particles diffuse around dots in this region. In such a case, which does not originally suffer the problem of color unevenness due to adjacent dots or overlapping dots, it may be the case that the dot size is differed only in the gray level region corresponding to the low and middle concentration region (such as a concentration of 50% or less), as schematically shown in FIG. 3.

Figure 4:
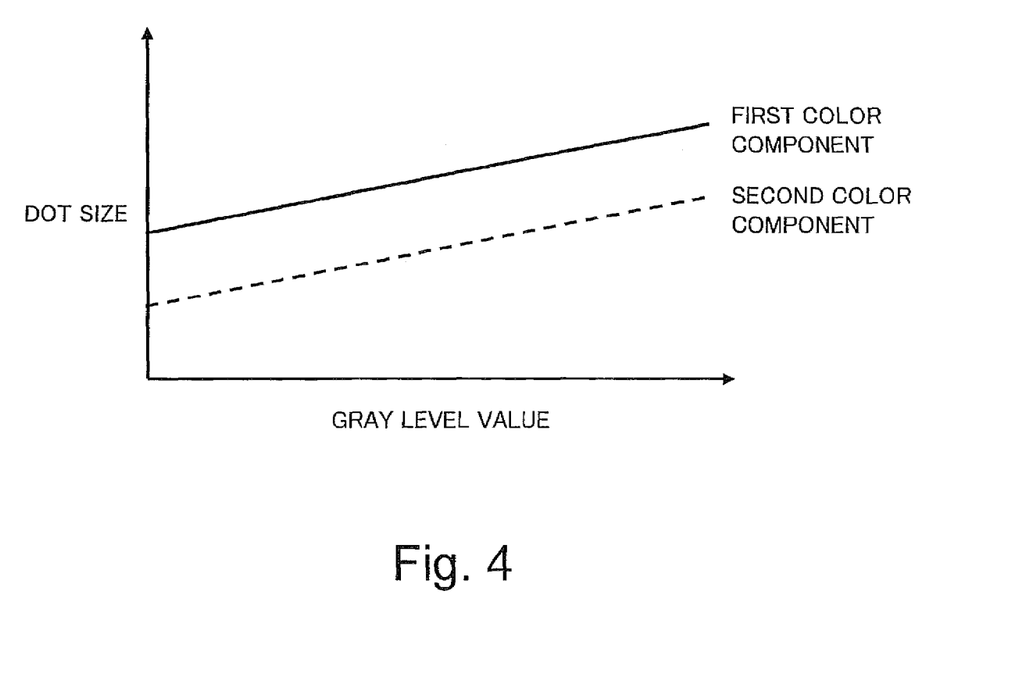
FIG. 4 is a view schematically showing a further example relationship between the gray level value and the dot size.

In addition, although in one aspect, as shown in FIG. 2, the dot size for each color is fixed over the entire gray level region, the dot size may vary depending on the gray level value. For example, in view of the circumstances that if the dot size is large, the level of graininess is poor in the low concentration region, the dot size may be varied in accordance with the gray level value of the input image information as schematically shown in FIG. 4, such that the lower the concentration, the smaller the dot size. Here, although the sizes of both the first and second color components vary in accordance with the gray level value of the input image information in FIG. 4, it may be the case that the dot size of either one of the first and second color components is varied.

When the input image information includes three or more color components, in accordance with one aspect, the conversion unit 12 converts the input image information into output image information in which the number of gray levels per pixel for each color component is smaller than that in the input image information and the gray level of the input image information for each color component is expressed by the gray level value of each pixel and a dot density. Then, in accordance with one aspect in this case, the conversion unit 12 converts the image information such that the dot size differs for each color component in the output image information. Here, however, it is sufficient that the dot size differs at least between the first color component and the second color component, and the dot size of the third color component may be the same as the dot size of the first (or second) color component. Further, the conversion unit 12 may perform the conversion processing described above with regard to at least two color components, regardless of the number of color components in the input image information.

The output unit 13 externally outputs the output image information obtained by the conversion unit 12 by using a RAM (Random Access Memory), for example.

The conversion processing to be performed by the conversion unit 12 described above will be specifically described. Although two examples of conversion processing will be described below, the conversion processing is not limited to these examples.

First Conversion Processing Example

In this conversion processing example, an image processing method described in JP 2003-348347 A is used. With this image processing method, error diffusion processing is performed with respect to input image information represented by multi-level values, so that the gray level of the input image information is expressed by binary data of multiple micro pixels, as described above. More specifically, the binarization processing is performed using an error diffusion method while regulating such that the size of a dot serving as a base dot for starting dot reproduction (i.e. a core dot) is a predetermined size or larger, and further, a dot of the minimum unit (subdot) is disposed at the position of a pixel adjacent to the core dot in accordance with the status of core dot generation and the concentration of image data, to thereby execute area modulation. According to the present conversion processing example, in the image processing method described in JP 2003-348347 A, the size of a core dot is made to differ between the first color component and the second color component so that the dot size is differed between the first color component and the second color component in the binarized output image information.

A specific example of this conversion processing will be described.

In this example, it is assumed that the input image information is image data with a resolution of 600×600 dpi, which contains first and second color components, and that the number of gray levels per pixel for each of the first and second color components is 256 (the gray level value is 0 to 255).

Meanwhile, it is assumed that the output image information is image data with a resolution of 2,400×2,400 dpi, which contains first and second color components, and that the number of gray levels per pixel for each of the first and second color components is 2 (the gray level value is 0 to 1). In this example, a pixel forming the output image information will be referred to as a "micro pixel" so as to be differentiated from a "pixel" of the input image information. The output image information is image information including 600×600 matrices of micro pixels (hereinafter referred to as a "micro pixel matrix") each including 4×4 micro pixels. Each micro pixel matrix corresponds to a pixel of the input image information.

Further, in this example, a state in which the gray level value of a micro pixel is "1"; that is, a state in which the micro pixel is colored, will be referred to as an ON state, and a state in which the gray level value of a micro pixel is "0"; that is, a state in which the micro pixel is not colored, will be referred to as an OFF state.

According to multi-level error diffusion processing in this example, each pixel forming the input image information is sequentially designated as a subject pixel for binarization processing (hereinafter referred to as a "noted pixel"), and binarization processing is performed with respect to the noted pixel. With this binarization processing, an ON/OFF pattern of a micro pixel matrix corresponding to the noted pixel (hereinafter referred to as a "micro pixel pattern") is determined. More specifically, on the basis of a corrected gray level value of the noted pixel obtained by adding a correction value such as an error value from a peripheral pixel which has been already processed to the gray level value of the noted pixel and the micro pixel pattern of processed pixels that are adjacent to the noted pixel on the left side, the upper side, and the upper left side (hereinafter referred to as "reference pixels"), the micro pixel pattern corresponding to the noted pixel is determined from the six patterns 1 to 6 described below.

Pattern 1: all the micro pixels are OFF; that is, a pattern forming all white (Wht).

Pattern 2: all the micro pixels are ON; that is, a pattern forming all black (Blk).

Figure 5:
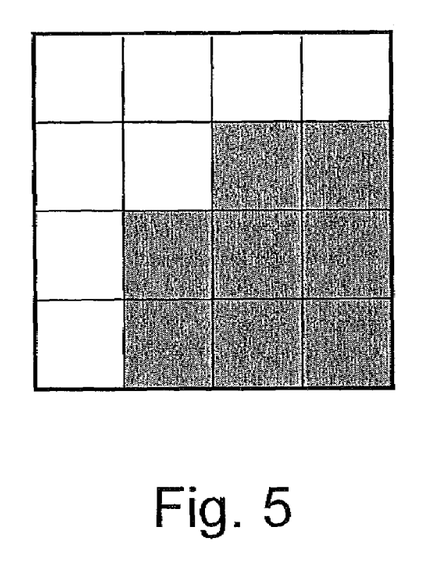
FIG. 5 is a view showing an example micro pixel pattern forming a black core dot.

Pattern 3: a predetermined number of micro pixels located at predetermined positions are ON; that is, a pattern forming a black core dot (Core_B). Here, as shown in FIG. 5, a pattern in which eight micro pixels located in the lower right corner are ON is illustrated. However, the number of micro pixels is not limited to eight, and can be any number of two or more. Further, in this conversion processing example, different numbers are set as the number of micro pixels that are ON, for each of the first color component and the second color component.

Figure 6:
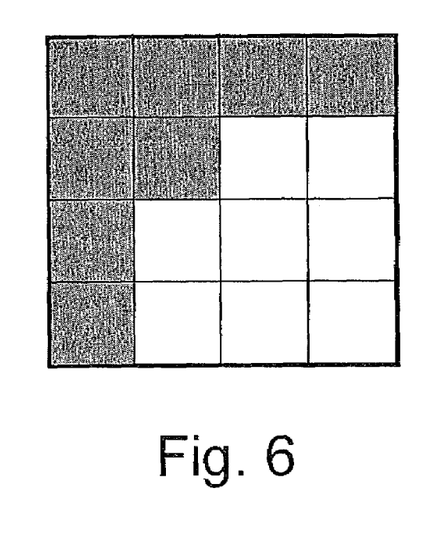
FIG. 6 is a view showing an example micro pixel pattern forming a white core dot.

Pattern 4: a predetermined number of micro pixels located at predetermined positions are OFF; that is, a pattern forming a white core dot (Core_W). Here, as shown in FIG. 6, a pattern in which eight micro pixels located in the lower right corner are OFF is illustrated. However, the number of micro pixels is not limited to eight, and can be any number of two or more. Further, in this conversion processing example, different numbers are set as the number of micro pixels that are OFF, for each of the first color component and the second color component.

Pattern 5: micro pixels located at positions adjacent to a black core dot are included and the micro pixels in a number in accordance with the corrected gray level value of the noted pixel are ON; that is, a pattern forming a black subdot (Sub_B).

Pattern 6: micro pixels located at positions adjacent to a white core dot are included and the micro pixels in a number in accordance with the corrected gray level value of the noted pixel are OFF; that is, a pattern forming a white subdot (Sub_W).

Figure 7:
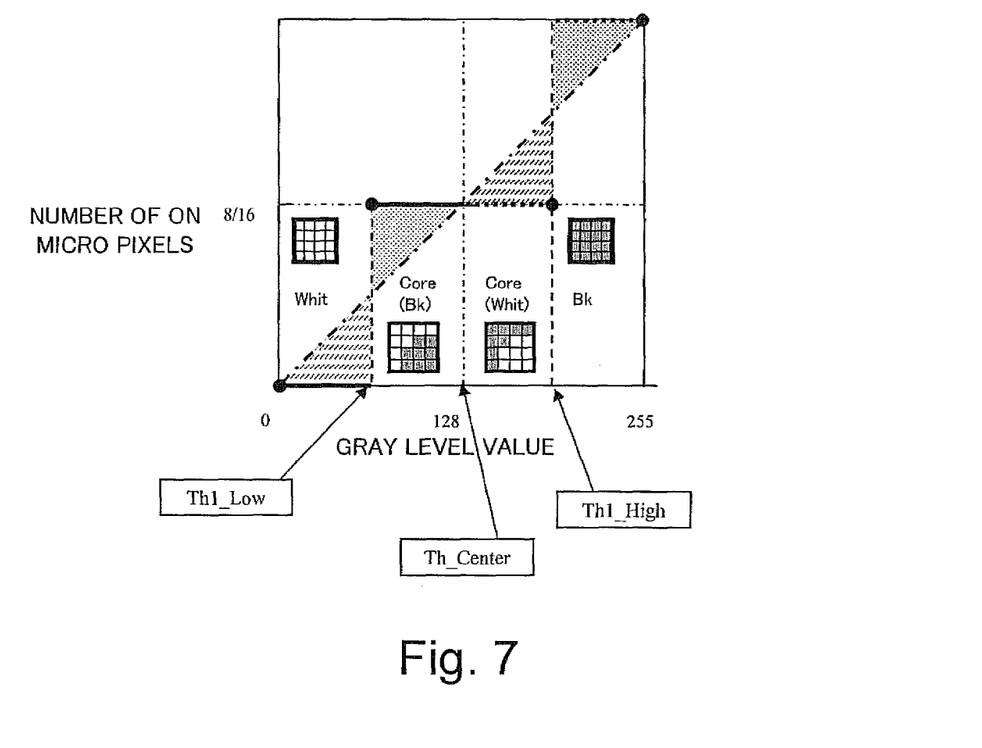
FIG. 7 is a view showing an example of a core dot determination map.
Figure 8:
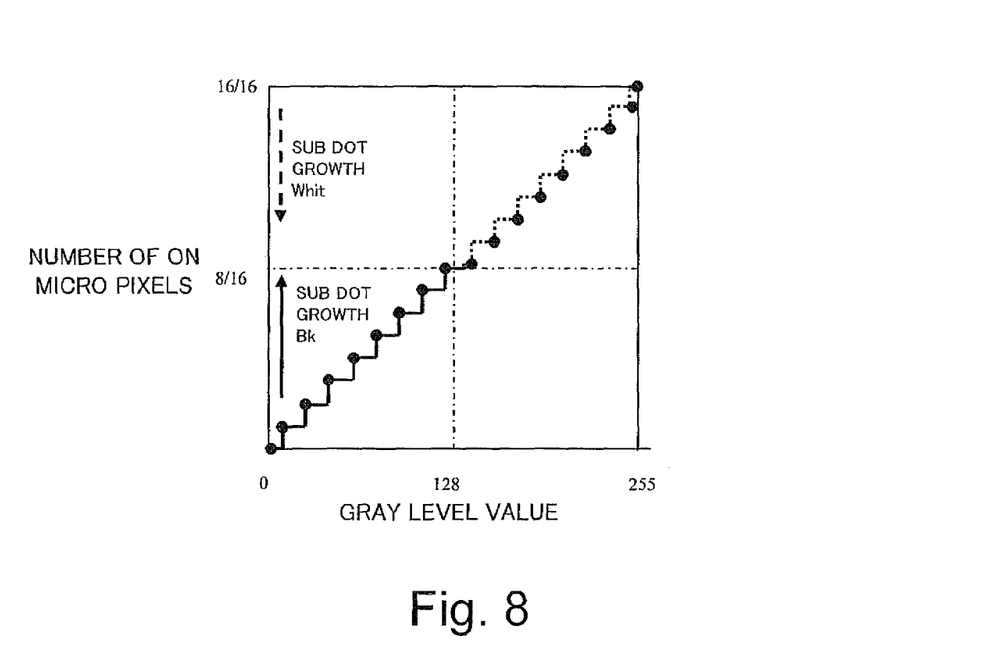
FIG. 8 is a view showing an example of a sub dot determination map.

FIG. 7 is a view showing a core dot determination map, and FIG. 8 is a view showing a subdot determination map. With reference to FIGS. 7 and 8, a method of determining a micro pixel pattern will be described.

Figure 9:
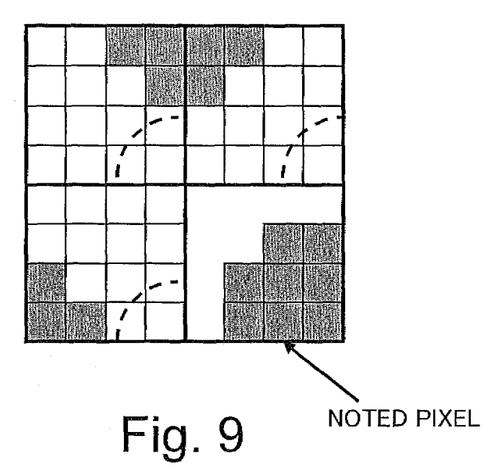
FIG. 9 is a view for explaining a case where a noted pixel can be a black core dot.
Figure 10:
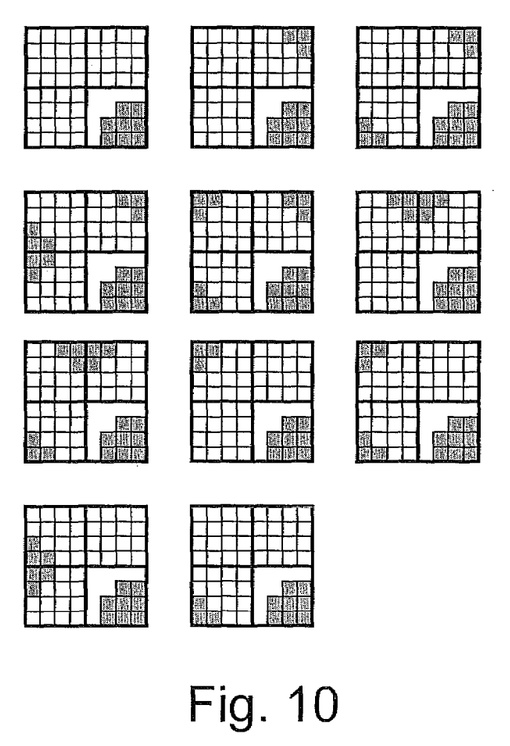
FIG. 10 is a view illustrating cases where a noted pixel can be a black core dot.

In a case where the micro pixel pattern corresponding to a black core dot (pattern 3) is not present in three reference pixels adjacent to a noted pixel as shown in FIG. 9 and also a corrected gray level value of the noted pixel is equal to or greater than a low threshold value Th1_Low and less than a center threshold value Th_Center, the micro pixel pattern is determined as a pattern corresponding to a black core dot (pattern 3). In this regard, FIG. 10 shows example cases in which a black core dot is not present in the three reference pixels adjacent to a noted pixel.

In a case where the micro pixel pattern corresponding to a black core dot (pattern 3) is not present in three reference pixels adjacent to a noted pixel as shown in FIG. 9 and also a corrected gray level value of the noted pixel is less than a low threshold value Th1_Low, the micro pixel pattern is determined to be a pattern corresponding to all white (pattern 1).

Figure 11:
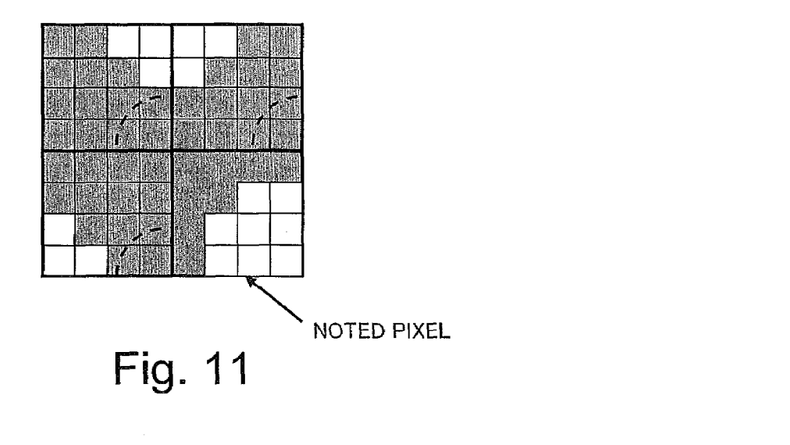
FIG. 11 is a view for explaining a case where a noted pixel can be a white core dot.

In a case where the micro pixel pattern corresponding to a white core dot (pattern 4) is not present in three reference pixels adjacent to a noted pixel as shown in FIG. 11 and also a corrected gray level value of the noted pixel is equal to or greater than a center threshold value Th_Center and less than a high threshold value Th1_High, the micro pixel pattern is determined to be a pattern corresponding to a white core dot (pattern 4).

In a case where the micro pixel pattern corresponding to a white core dot (pattern 4) is not present in three reference pixels adjacent to a noted pixel as shown in FIG. 11 and also a corrected gray level value of the noted pixel is equal to or greater than a high threshold value Th1_High, the micro pixel pattern is determined to be a pattern corresponding to all black (pattern 2).

Figure 12:
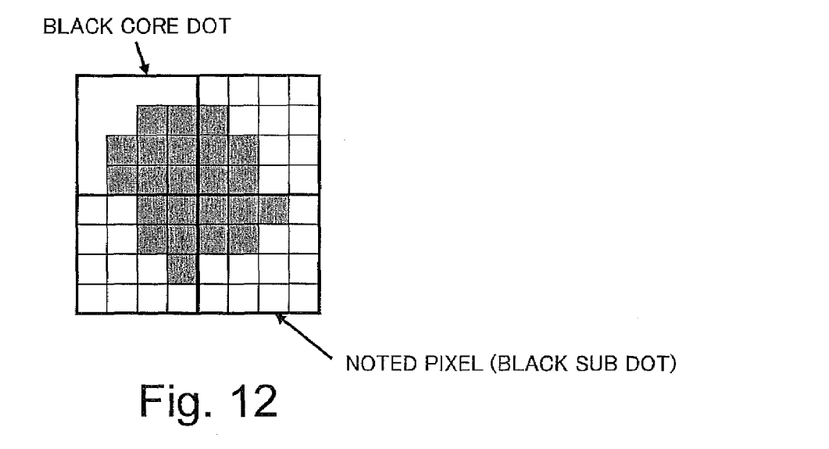
FIG. 12 is a view showing an example in which a noted pixel is converted into a black sub dot when a black core dot is present in the upper left position.

In a case where the micro pixel pattern corresponding to a black core dot (pattern 3) is present in three reference pixels adjacent to a noted pixel and also a corrected gray level value of the noted pixel is less than a center threshold value Th_Center, the micro pixel pattern is determined to be a pattern corresponding to a black subdot (pattern 5). Here, the number of micro pixels that are ON is determined in consideration of the corrected gray level value in accordance with the map of FIG. 8, and increases as the corrected gray level value is greater. Here, FIG. 12 shows an example in which a noted pixel is converted into a black subdot when a black core dot is present in the upper left pixel. As shown in FIG. 12, when a black core dot is present in the upper left position, micro pixels in the number determined in consideration of the corrected gray level value are turned ON from the upper left position.

Figure 13:
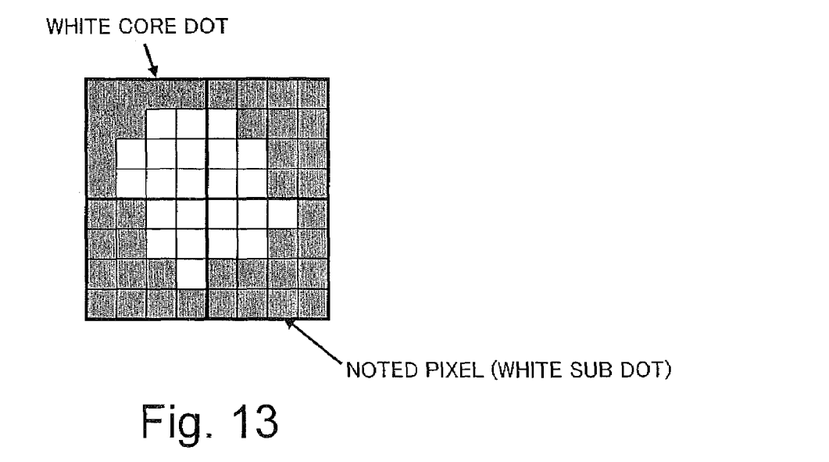
FIG. 13 is a view showing an example in which a noted pixel is converted into a white sub dot when a white core dot is present in the upper left position.

In a case where the micro pixel pattern corresponding to a white core dot (pattern 4) is present in three reference pixels adjacent to a noted pixel and also a corrected gray level value of the noted pixel is equal to or greater than a center threshold value Th_Center, the micro pixel pattern is determined to be a pattern corresponding to a white subdot (pattern 6). Here, the number of micro pixels that are OFF is determined in consideration of the corrected gray level value in accordance with the map of FIG. 8, and increases as the corrected gray level value becomes smaller. Here, FIG. 13 shows an example in which a noted pixel is converted into a white subdot when a white core dot is present in the upper left pixel. As shown in FIG. 13, when a white core dot is present in the upper left position, micro pixels in the number determined in consideration of the corrected gray level value are turned OFF from the upper left position.

Once the micro pixel pattern of a noted pixel is determined in accordance with the method of determining the micro pixel pattern as described above, an error value between a gray level value represented by the micro pixels that are turned ON in one pixel (in a micro pixel matrix) (that is, a gray level value obtained from the area ratio of the ON micro pixels to the area of the entire micro pixel matrix) and a corrected gray level value is calculated, and the error value thus calculated is diffused to peripheral pixels which have not been processed. More specifically, with regard to each pixel to which the error value is to be diffused (referred to as a diffusion target pixel), a predetermined weighting factor determined in consideration of relative positions of the diffusion target pixel and the noted pixel is multiplied by the error value to obtain a corrected value, and the corrected value is added to a gray level value of the diffusion target pixel.

Figure 14:
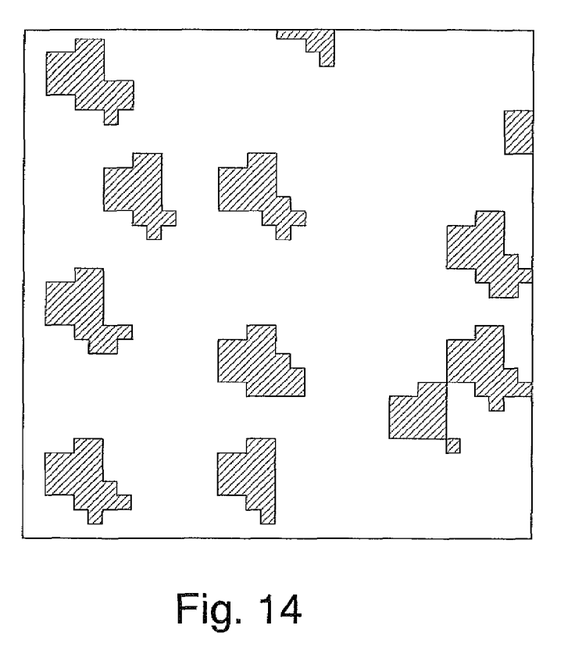
FIG. 14 is a view showing an example of a first color component of output image information in a first conversion processing example.
Figure 15:
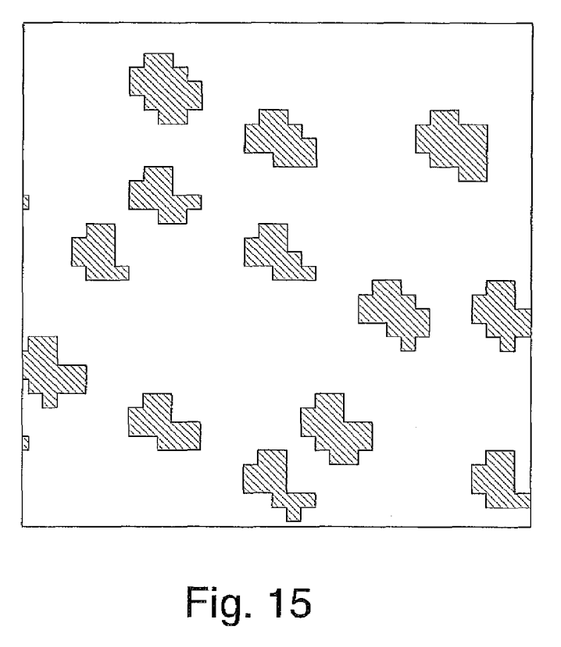
FIG. 15 is a view showing an example of a second color component of output image information in the first conversion processing example.
Figure 16:
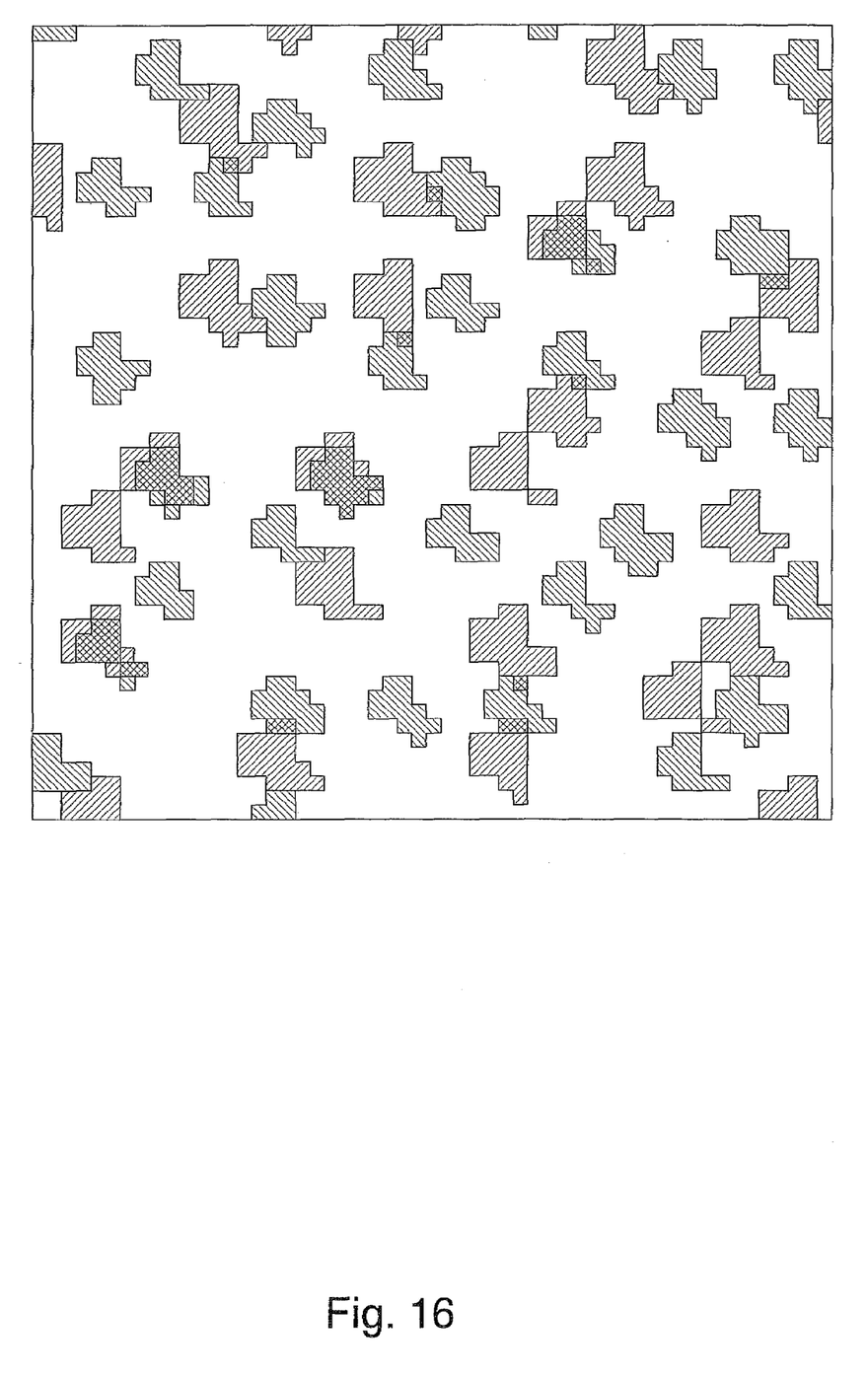
FIG. 16 is a view showing example output image information in a first conversion processing example.

When binarization processing was actually performed with respect to a halftone solid image in which the concentrations of the first and second color components are both 20% (the gray level value is 51) by means of the conversion processing method described above, the output image information shown in FIGS. 14 to 16 was obtained. FIG. 14 shows the first color component, and FIG. 15 shows the second color component. FIG. 16 shows the first and second color components that overlap each other. Here, FIGS. 14 and 15 each show a portion of the region shown in FIG. 16. In this exemplary embodiment, the core dot size of the first color component is 14 and the core dot size of the second color component is 8. Consequently, with regard to the first color component, one cluster is composed of approximately 19 micro pixels, and with regard to the second color component, one cluster is composed of approximately 14 micro pixels. Here, the core dot size refers to the number of ON micro pixels in the case of a black core dot and refers to the number of OFF micro pixels in the case of a white core dot. Further, the cluster refers to a collection of ON micro pixels formed by one or more ON micro pixels in the low gray level region, or refers to a collection of OFF micro pixels formed by one or more OFF micro pixels in the high gray level region. The cluster forms a dot. When comparing FIGS. 14 and 15, while the ratio of the number of ON micro pixels with respect to the number of all the micro pixels (that is, the area ratio of the ON micro pixels) is substantially the same for both the first and second color components, the size of a cluster is larger for the first color component and the density of clusters (the number of clusters per unit area) is smaller for the first color component.

Second Conversion Processing Example

In this conversion processing example, input image information of M gray levels (M is an integer equal to 3 or more) including first and second color components and having a predetermined input resolution is converted into output image information of N gray levels (N is an integer equal to 2 or more and is less than M). Here, the M (or N) gray levels indicates that the number of gray levels per pixel is M (or N).

Specifically, with regard to the first color component, input image information of M gray levels having a predetermined input resolution is converted into input image information of gray level having a first resolution. Then, the image information in which the resolution has been converted is converted into image information of N gray levels, and the resulting image information of N gray levels is further converted into image information having a predetermined output resolution. However, the conversion into the output resolution can be omitted.

Meanwhile, with regard to the second color component, input image information of M gray levels having a predetermined input resolution is converted into input image information of M gray levels having a second resolution which differs from the first resolution described above. Then, the image information in which the resolution has been converted is converted into image information of N gray levels and the resulting image information of N gray levels is further converted into image information having a predetermined output resolution. However, the conversion into the output resolution can be omitted.

Here, one of the first resolution and the second resolution may be the same as the input resolution. Then, if the first resolution is the same as the input resolution, conversion of the resolution with regard to the first color component is not necessary, and if the second resolution is the same as the input resolution, conversion of the resolution with regard to the second color component is not necessary.

A specific example of the present conversion processing will be described.

In this example, the input image information is image data of 256 gray levels (the gray level value is 0 to 255) having an input resolution of 600×600 dpi and including first and second color components.

Meanwhile, the output image information is image data of 2 gray levels (the gray level value is 0 or 1) having an output resolution of 2,400×2,400 dpi and including first and second color components.

Figure 17:
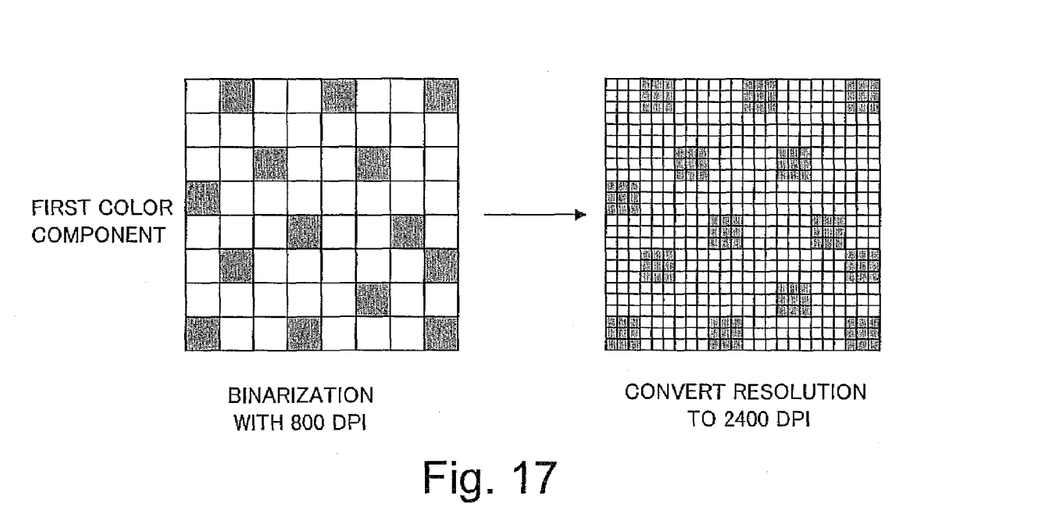
FIG. 17 is a view showing an example processing concerning a first color component in a second conversion processing example.

With regard to the first color component, as shown in FIG. 17, after image data having an input resolution of 600×600 dpi are converted into image data having a resolution of 800×800 dpi, the converted image data are binarized by means of an error diffusion method. The resulting image data are then converted into image data having an output resolution of 2400×2400 dpi.

Figure 18:
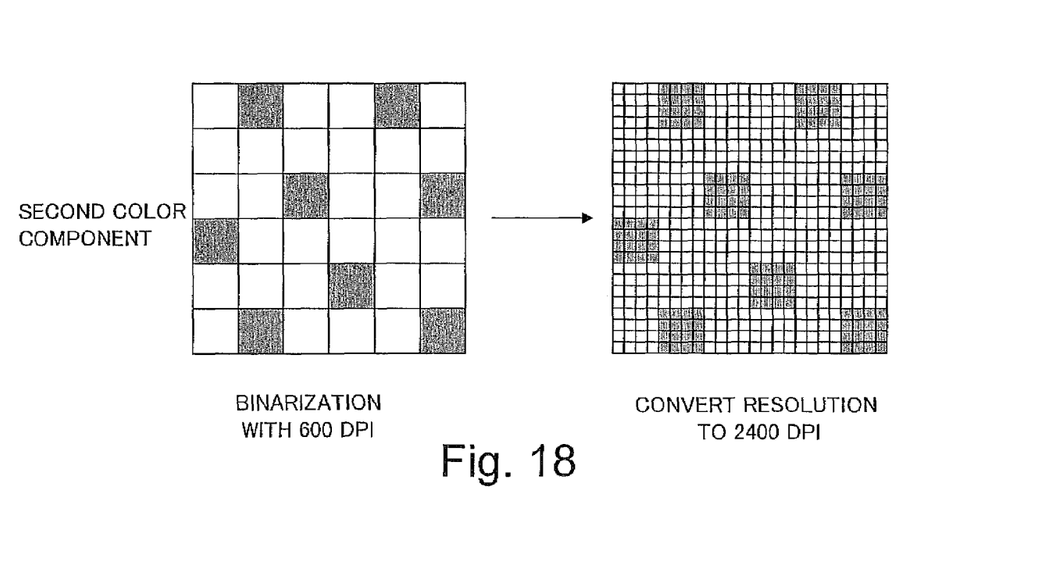
FIG. 18 is a view showing an example processing concerning a second color component in a second conversion processing example.

Meanwhile, with regard to the second color component, as shown in FIG. 18, image data having an input resolution of 600×600 dpi are binarized by means of an error diffusion method, and the resulting image data are then converted into image data having an output resolution of 2400×2400 dpi.

When FIGS. 17 and 18 are compared, although the ratio of colored area is substantially the same between the first color component and the second color component, the dot size is larger for the second color component and the dot density is smaller for the second color component.

The image processing apparatus 10 according to the present exemplary embodiment described above is applicable to various applications, and can be applied to, for example, a multicolor image forming apparatus (such as a color printer, a color copying apparatus, and so on).

Figure 19:
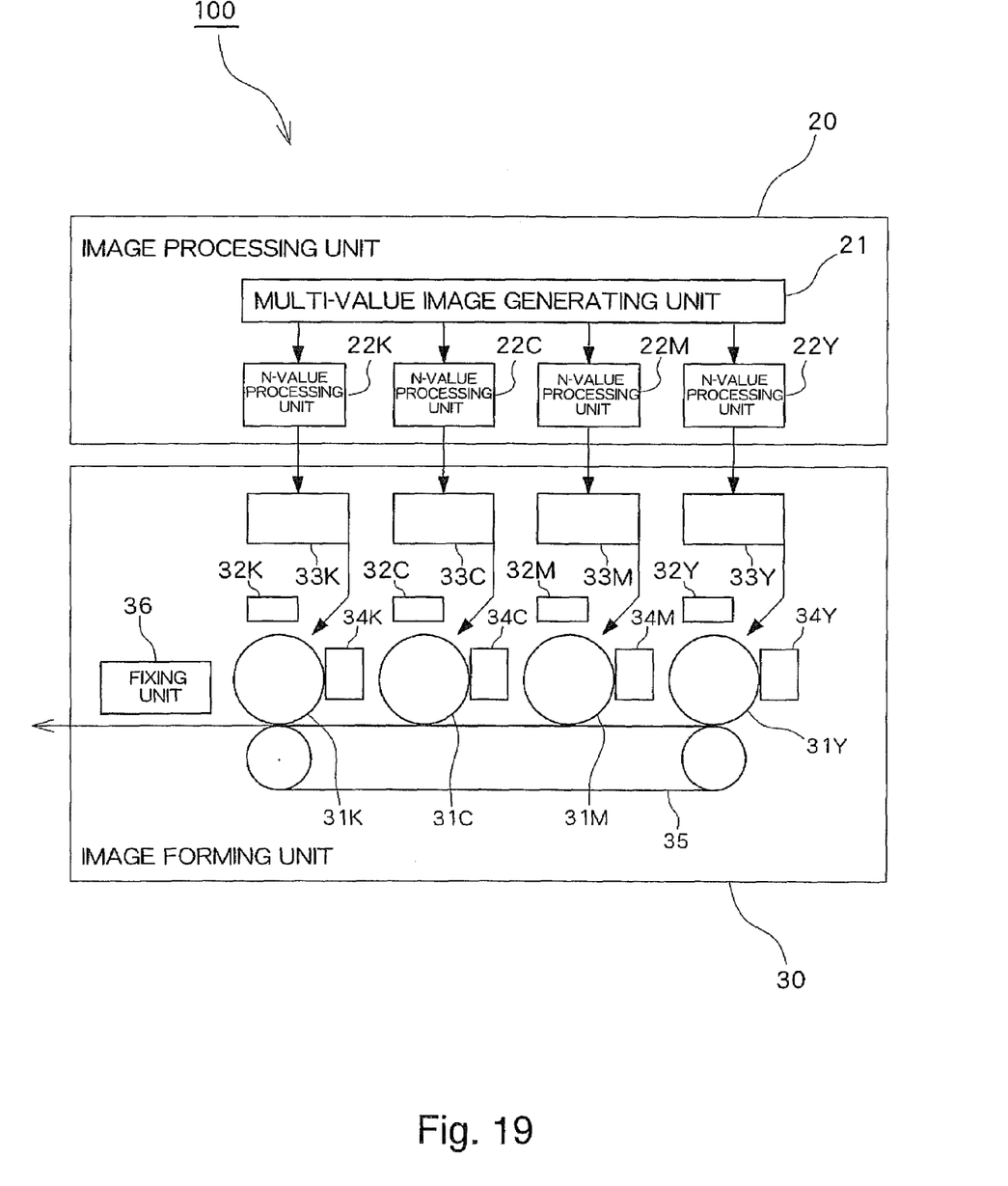
FIG. 19 is a view schematically showing the structure of a multicolor image forming apparatus including the image processing apparatus according to the exemplary embodiment.

FIG. 19 is a block diagram schematically showing a structure of a multicolor image forming apparatus 100 including the image processing apparatus according to the present exemplary embodiment. This multicolor image forming apparatus 100 is an apparatus which forms an image on a print medium such as paper by means of an electrophotographic method.

As shown in FIG. 19, the multicolor image forming apparatus 100 includes an image processing unit 20 and an image forming unit 30.

The image processing unit 20 will be described first. The image processing unit 20 includes a multi-value image generating unit 21 and N-value processing units 22Y, 22M, 22C, and 22K.

The multi-value image generating unit 21 receives input of PDL (Page Description Language) data from an external information processing apparatus (which may be a client apparatus such as a personal computer, for example), scan data read by a scanner from a document, or the like, and converts the input data into bit map image data of four colors (Y, M, C, K) having 256 gray levels. The multi-value image generating unit 21 then outputs the thus-obtained image data of Y, M, C, K colors to the corresponding N-value processing units 22Y, 22M, 22C, and 22K, respectively.

Each of the N-value processing units 22Y, 22M, 22C, and 22K binarizes the input image data of 256 gray levels which are input from the multi-value image generating unit 21 to generate output image data of 2 gray levels. At this time, each of the N-value processing units 22Y, 22M, 22C, and 22K performs binarization processing such that the gray level of the input image data is expressed by the gray level of each pixel and the dot density in the output image data and such that the size of the dot differs for the respective colors. Then, each of the N-value processing units 22Y, 22M, 22C, and 22K outputs the thus-obtained output image data of 2 gray levels to a corresponding exposure unit 33Y, 33M, 33C, or 33K, as will be described below.

The image forming unit 30 will be now described. The image forming unit 30 includes photosensitive members 31Y, 31M, 31C, and 31K for yellow (Y), magenta (M), cyan (C), and black (K), respectively. In a region around each of the photosensitive members 31Y, 31M, 31C, and 31K, a charging unit 32Y, 32M, 32C, or 32K, the exposure unit 33Y, 33M, 33C, or 33K, and a developing unit 34Y, 34M, 34C, or 34K are provided. These four photosensitive members are disposed in parallel to each other along the sheet transport direction (i.e. in the direction of the arrow X in FIG. 19), and a transfer belt 35 is provided in contact with these photosensitive members. Further, a fixing unit 36 is provided downstream of the four photosensitive members in the sheet transport direction.

Each of the charging units 32Y, 32M, 32C, and 32K uniformly charges the surface of the corresponding one of the photosensitive members 31Y, 31M, 31C, and 31K.

Each of the exposure units 33Y, 33M, 33C, and 33K irradiates the uniformly charged surface of the corresponding photosensitive member 31Y, 31M, 31C, or 31K with a laser beam to thereby form an electrostatic latent image thereon. More specifically, each of the exposure units 33Y, 33M, 33C, and 33K controls ON/OFF of laser beam irradiation on the basis of the output image data of 2 gray levels input from the corresponding N-value processing unit 22Y, 22M, 22C, or 22K, thereby forming on the photosensitive member an electrostatic latent image corresponding to the output image data.

Each of the developing units 34Y, 34M, 34C, and 34K develops the electrostatic latent image formed on the photosensitive members 31Y, 31M, 31C, or 31K, with toner of the corresponding color Y, M, C, or K.

The toner images of Y, M, C, and K colors formed on the photosensitive members 31Y, 31M, 31C, and 31K, respectively, are sequentially transferred onto a recording medium such as paper which is being transported on the transfer belt 35. Then, the recording medium on which the toner images of Y, M, C, and K colors have been transferred is transported to the fixing unit 36, which then fixes the toner image onto the recording medium.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An image processing apparatus, comprising:
    a conversion unit that, by using a binarization processing for expressing a gray level by a dot density, converts input image information which includes a first color component and a second color component and in which, with regard to each of the color components, the number of gray levels per pixel is no less than three, into output image information in which a gray level of the input image information is expressed by a dot density with regard to each of the color components and in which, for each of the color components, the number of gray levels per pixel is two; and
    an output unit that outputs the output image information obtained by the conversion unit;
    wherein in at least a part of gray level regions, when gray level values of the input image information are identical for the first color component and the second color component, the conversion unit converts the input image information into the output image information such that dot sizes in the output image information become different between the first color component and the second color component.

2. The image processing apparatus according to claim 1, wherein the input image information includes a yellow color component and a color component of at least one of cyan, magenta, and black, and the size of a dot of the yellow color component is larger than the size of a dot of the at least one of cyan, magenta, and black.

3. The image processing apparatus according to claim 2, wherein the size of a dot of at least one of the first and second color components is varied in accordance with a gray level value of the input image information such that the size of the dot becomes smaller as a concentration of the input image information decreases.

4. The image processing apparatus according to claim 1, wherein the size of a dot of at least one of the first and second color components is varied in accordance with a gray level value of the input image information such that the size of the dot becomes smaller as a concentration of the input image information decreases.

5. The image processing apparatus according to claim 1, wherein for each of the color components, based on a corrected gray level value obtained by adding, to a gray level value of a noted pixel of the input image information, an error value from an already-processed pixel peripheral to the noted pixel, and based on a pixel matrix pattern of a pixel adjacent to the noted pixel, the conversion unit performs a binarization processing for determining a coloring pattern of the pixel matrix in the output image information corresponding to the noted pixel;
    the coloring pattern includes a core dot pattern in which a predetermined plurality of pixels are colored to form a base dot, and a sub dot pattern in which a number of pixels according to the corrected gray level value are colored to constitute a dot together with the core dot pattern; and
    the number of pixels colored in the core dot pattern is different between the first color component and the second color component.

6. The image processing apparatus according to claim 1, wherein with regard to the first color component, the conversion unit subjects input image information having a predetermined input resolution to a conversion into image information having a first resolution that is different from the input resolution, and performs a binarization processing with respect to the image information that has been subjected to this resolution conversion; and with regard to the second color component, the conversion unit subjects input image information having a predetermined input resolution to a conversion into image information having a second resolution that is different from the first resolution and performs a binarization processing with respect to the image information that has been subjected to this resolution conversion, or alternatively, the conversion unit performs a binarization processing with respect to the input image information.

7. A multicolor image forming apparatus, comprising:

a conversion unit that, by using a binarization processing for expressing a gray level by a dot density, converts input image information which includes a first color component and a second color component and in which, with regard to each of the color components, the number of gray levels per pixel is no less than three, into output image information in which a gray level of the input image information is expressed by a dot density with regard to each of the color components and in which, for each of the color components, the number of gray levels per pixel is two; and an image forming unit that forms an image including the first color component and the second color component on a recording medium on the basis of the output image information;

wherein in at least a part of gray level regions, when gray level values of the input image information are identical for the first color component and the second color component, the conversion unit converts the input image information into the output image information such that dot sizes in the output image information become different between the first color component and the second color component.

8. The multicolor image forming apparatus according to claim 7, wherein the input image information includes a yellow color component and a color component of at least one of cyan, magenta, and black, and the size of a dot of the yellow color component is larger than the size of a dot of the at least one of cyan, magenta, and black.

9. The multicolor image forming apparatus according to claim 8, wherein the size of a dot of at least one of the first and second color components is varied in accordance with a gray level value of the input image information such that the size of the dot becomes smaller as a concentration of the input image information decreases.

10. The multicolor image forming apparatus according to claim 7, wherein the size of a dot of at least one of the first and second color components is varied in accordance with a gray level value of the input image information such that the size of the dot becomes smaller as a concentration of the input image information decreases.

11. A method of processing an image, comprising:

converting, by using a binarization processing for expressing a gray level by a dot density, input image information which includes a first color component and a second color component and in which, with regard to each of the color components, the number of gray levels per pixel is no less than three, into output image information in which a gray level of the input image information is expressed by a dot density with regard to each of the color components and in which, for each of the color components, the number of gray levels per pixel is two; and outputting the output image information obtained by the conversion:

wherein in at least a part of gray level regions, when gray level values of the input image information are identical for the first color component and the second color component, the input image information is converted into the output image information such that dot sizes in the output image information become different between the first color component and the second color component.

12. A computer readable medium storing a program causing a computer to execute a process for processing an image, the process comprising:

converting, by using a binarization processing for expressing a gray level by a dot density, input image information which includes a first color component and a second color component and in which, with regard to each of the color components, the number of gray levels per pixel is no less than three, into output image information in which a gray level of the input image information is expressed by a dot density with regard to each of the color components and a in which, for each of the color components, the number of gray levels per pixel is two; and outputting the output image information obtained by the conversion;

wherein in at least a part of gray level regions, when gray level values of the input image information are identical for the first color component and the second color component, the input image information is converted into the output image information such that dot sizes in the output image information become different between the first color component and the second color component.

13. The computer readable medium according to claim 12, wherein the input image information includes a yellow color component and a color component of at least one of cyan, magenta, and black, and the size of a dot of the yellow color component is larger than the size of a dot of the at least one of cyan, magenta, and black.

14. The computer readable medium according to claim 13, wherein the size of a dot of at least one of the first and second color components is varied in accordance with a gray level value of the input image information such that the size of the dot becomes smaller as a concentration of input image information decreases.

15. The computer readable medium according to claim 12, wherein the size of a dot of at least one of the first and second color components is varied in accordance with a gray level value of the input image information such that the size of the dot becomes smaller as a concentration of the input image information decreases.

* * * * *